(12) United States Patent
Asthana et al.

(10) Patent No.: US 10,387,083 B2
(45) Date of Patent: Aug. 20, 2019

(54) PRINT FORMAT VERSION WITH OVERLAID MACHINE-READABLE LINK

(71) Applicant: Hewlett-Packard Development Company, L.P., Houston, TX (US)

(72) Inventors: Prashant Asthana, Bangalore (IN); Rajesh Bhatia, Bangalore (IN); Bharani Nunna, Bangalore (IN); Sekhar Sirigiri, Bangalore (IN); Jeniki Pradeep Kumar, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 1 day.

(21) Appl. No.: 15/559,091

(22) PCT Filed: Apr. 20, 2016

(86) PCT No.: PCT/US2016/028403
§ 371 (c)(1),
(2) Date: Sep. 18, 2017

(87) PCT Pub. No.: WO2017/027076
PCT Pub. Date: Feb. 16, 2017

(65) Prior Publication Data
US 2018/0052642 A1    Feb. 22, 2018

(30) Foreign Application Priority Data

Jul. 31, 2015    (IN) .......................... 3992/CHE/2015

(51) Int. Cl.
*G06F 3/12*    (2006.01)
*G06K 9/20*    (2006.01)
*H04N 1/32*    (2006.01)

(52) U.S. Cl.
CPC .......... *G06F 3/1206* (2013.01); *G06F 3/1204* (2013.01); *G06F 3/1242* (2013.01);
(Continued)

(58) Field of Classification Search
CPC .... G06F 3/1206; G06F 3/1204; G06F 3/1242; G06F 3/1245; G06F 3/1285;
(Continued)

(56) References Cited

U.S. PATENT DOCUMENTS 8,614,833 B2    12/2013    Oda et al.
2001/0006585 A1    7/2001    Norigane
(Continued)

FOREIGN PATENT DOCUMENTS

CN           103024245 A          4/2013
WO         WO-2009-070099         6/2009
WO       WO-2015164097 A1 *     10/2015 ........... G06F 3/1206

OTHER PUBLICATIONS

Fioretti, M., "Add Watermarks to All Your ODF Files Automatically", < http://www.techrepublic.com/blog/ >, Jul. 19, 2012, 10pp.
(Continued)

*Primary Examiner* — Quang N Vo
(74) *Attorney, Agent, or Firm* — HP Inc. Patent Department (57) ABSTRACT

Examples disclosed herein relate to generating a print format version with an overlaid machine-readable link. As an example, a set of machine-readable links assigned to a user account from a remote repository is obtained. In response to a print command associated with the user account, one machine-readable link from amongst the set of the machine-readable links is selected and applied onto a portion of the digital document. Thereafter, a print format version of the digital document along with the machine-readable link is generated.

15 Claims, 6 Drawing Sheets

(52) U.S. Cl.
CPC .......... *G06F 3/1245* (2013.01); *G06F 3/1285* (2013.01); *G06K 9/2063* (2013.01); *H04N 1/32144* (2013.01); *G06F 3/1247* (2013.01); *G06K 2215/0014* (2013.01)

(58) Field of Classification Search
CPC ................ G06F 3/1247; G06K 9/2063; G06K 2215/0014; G06Q 30/02; H04N 1/32144
USPC ........................................ 358/3.28, 1.9, 1.15
See application file for complete search history.

(56) References Cited

U.S. PATENT DOCUMENTS

| | | |
|---|---|---|
| 2007/0174620 A1 | 7/2007 | Lin |
| 2008/0292139 A1 | 11/2008 | Wadhwa et al. |
| 2010/0039663 A1 | 2/2010 | Ohsone |
| 2011/0255111 A1 | 10/2011 | Kazutaka et al. |
| 2013/0031150 A1* | 1/2013 | Kamath ............... G06F 17/2264 707/827 |
| 2014/0139882 A1 | 5/2014 | Katoh |
| 2015/0092248 A1* | 4/2015 | Altfeder ............. H04N 1/32229 358/3.28 |

OTHER PUBLICATIONS

Kaywa, "What is a dynamic QR Code? And how do I create one?," (Web page), Dec. 29, 2013, <http://web.archive.org/web/ ~ 3 pages.
Muller, E.I., Scan Anything and Let Your Phone Do the Rest, (Web Page), Oct. 25, 2011, <http://www.technologyreview.com/ ~ 3 pages.
QRSTUFF.com, Password Protected QR Codes, Oct. 31, 2011, http://www.qrstuff.com/blog/2011/10/31/password-protected-qr-codes (3 pages).
ScanLife, "Analytics Engine," Jan. 8, 2014, <http://www.scanlife.com/analytics-engine>. 2 pages.
ScanLife, "Code Actions," Jan. 8, 2014, <http://www.scanlife.com/code-actions>. 3 pages.
ScanLife, "Helping Marketers Deliver Mobile Engagement with QR Codes on Steroids," Jan. 24, 2013, <http://www.scanlife.com/blog/ ~ 2 pages.
ScanLife, "QR Code Generation Pricing Plans: Enterprise" Jan. 8, 2014, <http://www.scanlife.com/pricing>. 3 pages.
ScanLife, "ScanLife QR Code Creation Plans," Jan. 8, 2014, <http://www.scanlife.com/pricing>. 2 pages.
ScanLife, Our QR Codes Speak Your Language, Nov. 5, 2012, http://www.scanlife.com/blog/2012/11/our-qr-codes-speak-your-language/ (2 pages).

* cited by examiner

PRINT FORMAT VERSION WITH OVERLAID MACHINE-READABLE LINK

BACKGROUND

Printed documents may be provided with machine-readable links. Such links may be optically readable by a computing device with an image capture device making the printed document interactive using such computing devices. The machine-readable inks may be encoded or associated with various types of information, which in turn may supplement or complement the content of the printed document. Examples of such links include one- or two-dimensional barcodes, digital watermarks, image fingerprints, and the like. Interaction with such machine-readable links allows any user to access information encoded within the respective machine-readable links.

BRIEF DESCRIPTION OF THE DRAWINGS

The following detailed description references the drawings, wherein.

DETAILED DESCRIPTION

Printed medium has so far been one mechanism for distribution of content. The content is printed as a document which may then be distributed for dissemination of such content. However, the extent and the amount of information that may be conveyed are limited by the area of the printed medium on which content is printed. In some cases, the print medium may further include one or more machine-readable links. The machine-readable links, when optically read by a computing device, may allow access to additional information via a communication network. Such additional information may further supplement the content on the printed document.

Not all such printed documents may be accompanied with machine-readable inks. In such a case, if any additional information is to be linked to such a document, a machine-readable link encoded with such information is embedded into the printed document. Such processes generally involve scanning the digital document to be printed. Once scanned, the digital version of the printed document may be processed to identify and extract different portions, for example, images or textual content, of the document. Thereafter, the extracted portions may be associated with a machine-readable link.

In order to recreate the document, the portion linked with the machine-readable link is repositioned at its original location. This may entail re-inserting the different extracted portions and the machine-readable links into the digital document. Such a process when undertaken is considerably extensive in terms of effort and computational resources. Furthermore, the machine-readable links may have to be generated and available with the user who intends to embed the machine-readable links into the digital document.

Approaches for generating a print format version with an overlaid machine-readable link, are described. The present approaches provide a print format version of a digital document having one or more machine-readable links generated by a print driver. The machine-readable links may be overlaid onto different portions of the digital document. The print format version may be considered as any file format which may be utilized for printing. The print format version may also be considered as an intermediate format which in turn may be rendered for printing or for displaying, by a print driver.

The digital document with the overlaid machine-readable links may be printed using a computing device. For generating a print format version with an overlaying machine-readable link, a print driver within the computing device may initially obtain a set of machine-readable links from a remote repository. The set of machine-readable inks are such that they are each associated with a user account of a linking service. The linking service, in one example, may be service being implemented on a computing device. The linking service, in the present example, may maintain a plurality of user accounts, wherein each user account is provided with one or more machine-readable links. The linking service may be communicated with to obtain machine-readable links when such links assigned with a user are either not available or have exhausted. Depending on the credentials being used by a user at the computing device, the machine-readable links corresponding to the user account are obtained by the print driver.

Thereafter, the print driver may monitor for print commands within the computing device. In one example, a print command for printing a digital document is intercepted. Once the print command is intercepted, print data corresponding to the print command is analyzed. Based on the analysis, one or more portions of the digital document are identified. The print driver may obtain one of the machine-readable links from the set of machine-readable links associated with the user. The obtained machine-readable link is overlaid onto a portion of the digital document.

Once the machine-readable link is overlaid onto the digital document, the print driver generates a print format version. The print format version may be considered as an intermediate format to be rendered for either printing or displaying, by the print driver. The print format version includes the original content of the digital document along with the overlaid machine-readable link. In examples described herein, "original" content of a digital document may be the content included in the digital document when provided from an author, publisher, creator, or other producer (i.e., person(s) or entit(ies)) of the digital document. In one example, the print format version may include Portable Document Format (PDF) file format, an Open XML Paper Specification (XPS), and an Enhanced Metafile (EMF) file format, without limiting the scope of the present subject matter. Once the print format version is generated, the print command may be then be executed and the digital document may be printed by a print device. In the present example, the printed document includes the original content as well as the overlaid machine-readable link. A plurality of machine-readable links may also be overlaid onto different portions of the digital document in the same manner without deviating from the scope of the present subject matter.

In yet another example, the print format version so generated may be transmitted, and stored at a network accessible location over a communication network. In the present example, the digital document corresponding to the print format version may be analyzed. Based on the analysis, content-specific information corresponding to the content of the portion with the applied machine-readable link is determined. Such content-specific information is then linked or associated with the machine-readable link as their respective payoffs. A payoff may be considered as any information which is obtained upon capturing an image of machine-readable link and fetching information inked to, or embedded within, such a machine-readable link. The payoff may be in any form, such as text, images, illustrations, or combinations thereof. The payoff once obtained may be presented on a digital communication device. In one example, the content-specific information may be obtained by a user and manually linked to the corresponding machine-readable link from either a private data repository and a public data repository. In another example, the content-specific information may be determined through document based analysis of the different portions of the digital document.

The print format version may then be used by printers for printing the contents of the digital document onto a print medium, for example, printable paper. The print format version may also be used for digitally rendering the digital document along with the overlaying machine-readable links onto a display device, for example, of either another desktop or a hand-held computing device. The printed or rendered document may be further utilized for accessing content-specific information corresponding to the different portions of the digital document by reading the machine-readable link.

In examples described herein, the machine-readable link may be resolved to access the payoff, i.e., the content-specific information associated with the machine-readable link. In the present example, an image of the machine-readable link may be captured by a computing device, which is remote from a device generating a print format version with overlaying machine-readable links. For example, the computing device may include an image capturing device, such as a digital camera, which may capture an image of the machine-readable link. The machine-readable link may subsequently be processed to determine either the content-specific information or a location of data store where the content-specific information may be located. Based on the machine-readable link, the computing device may communicate with the data store for accessing stored content-specific information which is associated with the machine-readable link. The content-specific information may be then obtained and displayed onto the computing device. In such a manner, the machine-readable link is resolved even though the content-specific information is not printed or available on the printed document. The content-specific information may include comments posted by a user, an audio clip, a video, or a link for accessing the aforementioned types of media.

As would be understood, a machine-readable link may include any printed indicators which are optically readable by a computing device. Examples of such machine-readable links include, but are not limited to, one- or two-dimensional barcodes, digital watermarks, optically readable images, QUICK RESPONSE (QR) codes, and the like. The machine-readable link provided onto the printed document may or may not be visible or discernible to a naked eye.

In another example, a linking engine associated with the remote repository may assign a predefined number of machine-readable links to a user account. Such machine-readable links may then be provided to user as part of a subscription service. The linking engine may provide machine-readable links assigned to the user in sets. Once the set of machine-readable links is exhausted, another set of machine-readable links assigned to the user may be provided. In the present example, the user account may be uniquely identifiable through one or more identifiers.

In this manner, by way of examples described herein, digital documents may be printed with overlaid machine-readable links. The machine-readable links may be subsequently associated or linked with content-specific information which is accessible on interacting with the respective machine-readable links. Such printed documents may not involve extracting portions of the document to be printed and reinserting such portions (but now with overlaid machine-readable links) back into the document. As a result, the process for generating the printed documents which also include overlaid machine-readable links is not computationally or manually extensive. Furthermore, such approaches allow for the interactive printed documents to be generated on the fly and with minimal intervention.

Examples are further described herein with reference to FIGS. 1-6. It should be noted that the description and figures relate to example implementations, and should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1:
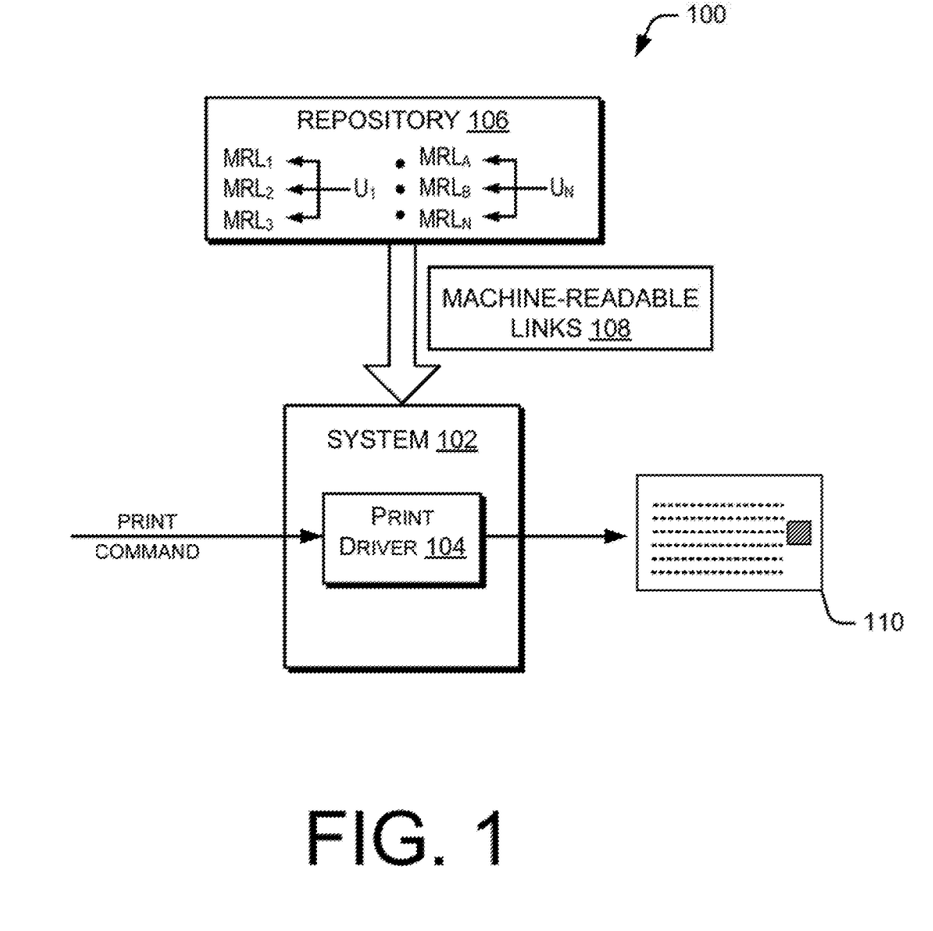
FIG. 1 is a block diagram of an example computing environment to generate a print format version with an overlaid machine-readable link.

FIG. 1 provides a block diagram for an example system 102 which generates a print format version of a digital document with one or more overlaid machine-readable links. In the present example, the system 102 includes a print driver 104. The system 102 may be implemented as a computing device. The system 102 is in communication with a remote repository 106 over a communication network. The repository 106 stores a plurality of machine-readable links (as indicated by $MRL_1$, $MRL_2$, . . . , $MRL_N$). Each of the machine-readable links is assigned to a user (for example, $U_1$). For example, each of the machine-readable links within the repository 106 may be associated with a user identification. Accordingly, within the repository 106 a plurality of machine-readable links ($MRL_1$, $MRL_2$, . . . , $MRL_N$) each of which are assigned to different users ($U_1$, $U_2$, . . . , $U_N$) are stored.

In operation, any user interacting with the system 102 may provide their user credentials. In some cases, the users may use and interact with the system 102. In other cases, the interaction with the system 102 may be affected by way of any other computing devices (not shown in FIG. 1) in communication with the system 102, and being operated and utilized by such users. During the course of using and operating such other computing devices, the users may provide their user credentials. Such user credentials may subsequently be communicated to the system 102, and eventually obtained by the print driver 104. Based on the user credentials, print driver 104 of the system 102 obtains a first set of machine-readable links 108 from the repository 106. During the course of interaction with the system 102, the user may initiate a print command for printing a digital document. In one example, the print driver 104 may intercept the print command for printing the digital document. Upon intercepting, the print data corresponding to the print command may be further analyzed to identify portions of the digital document. The portions of the digital document may include images, illustrations, texts, etc.

For each of the identified portions of the digital document, the print driver 104 obtains a machine-readable link from the first set of machine-readable links 108. The obtained machine-readable link is then overlaid onto a portion of the digital document. In a similar manner, the print driver 104 may obtain another machine-readable link for overlaying onto other portions of the digital document.

Once the machine-readable link is overlaid onto the digital document, the print driver 104 generates a print format version corresponding to the digital document with the overlaid machine-readable link. The print format version may be considered as any intermediate file format which may be used for printing the digital document with the machine-readable link onto a print medium, or may alternatively be also used for rendering a representation of digital document with the machine-readable link onto a display device (not shown in FIG. 1). The display device in turn may be coupled to or embedded into another computing device.

The print format version once generated may be communicated to a remotely accessible network location for storage and subsequent use. In case the digital document is requested, the print format version corresponding to the digital document with the machine-readable link may be obtained from such remotely accessible network location and provided according to the request. In another example, various engines implemented at the remotely accessible network location may be utilized for determining content-specific information corresponding to the content included within the portion of the digital document onto which the machine-readable link was applied. The content-specific information is then subsequently linked with the overlaid machine-readable link. In the present example, the remotely accessible network location may be associated with the same computing device implementing a linking engine as part of a linking service (not shown in FIG. 1). In such a case, the linking engine may also link the content-specific information with the machine-readable link overlaid onto the digital document. The content-specific information may be obtained from a private data repository or a public data repository In examples described herein, a "linking service" may be a service implemented by one or more networked computing devices to maintain a plurality of subscription based user accounts, each of which may be allocated one or more machine-readable links, such as machine-readable links 108. Furthermore, the linking service may also create and manage optically machine-readable links, and to create and manage the assignment of digital content payoffs in the form of content-specific information to respective optically machine-readable links. In some other examples, a linking service may also provide a computing device access to a content-specific information corresponding to a given optically machine-readable link in response to an indication that the computing device has captured an image of the given optically machine-readable link. In examples described herein, a "content-specific information" may be any suitable type of information that may be accessed (e.g., retrieved, viewed, etc.) over a computer network, such as a digital video, a website or webpage, a uniform resource identifier (URI) (such as a uniform resource locator (URL)) for web content (e.g., a website), or the like. These aspects along with the manner in which the print driver 104 generates a print format version with an overlaid machine-readable link, such as the machine-readable link, is further described by way of examples, as provided in conjunction with FIGS. 2-3.

Figure 2:
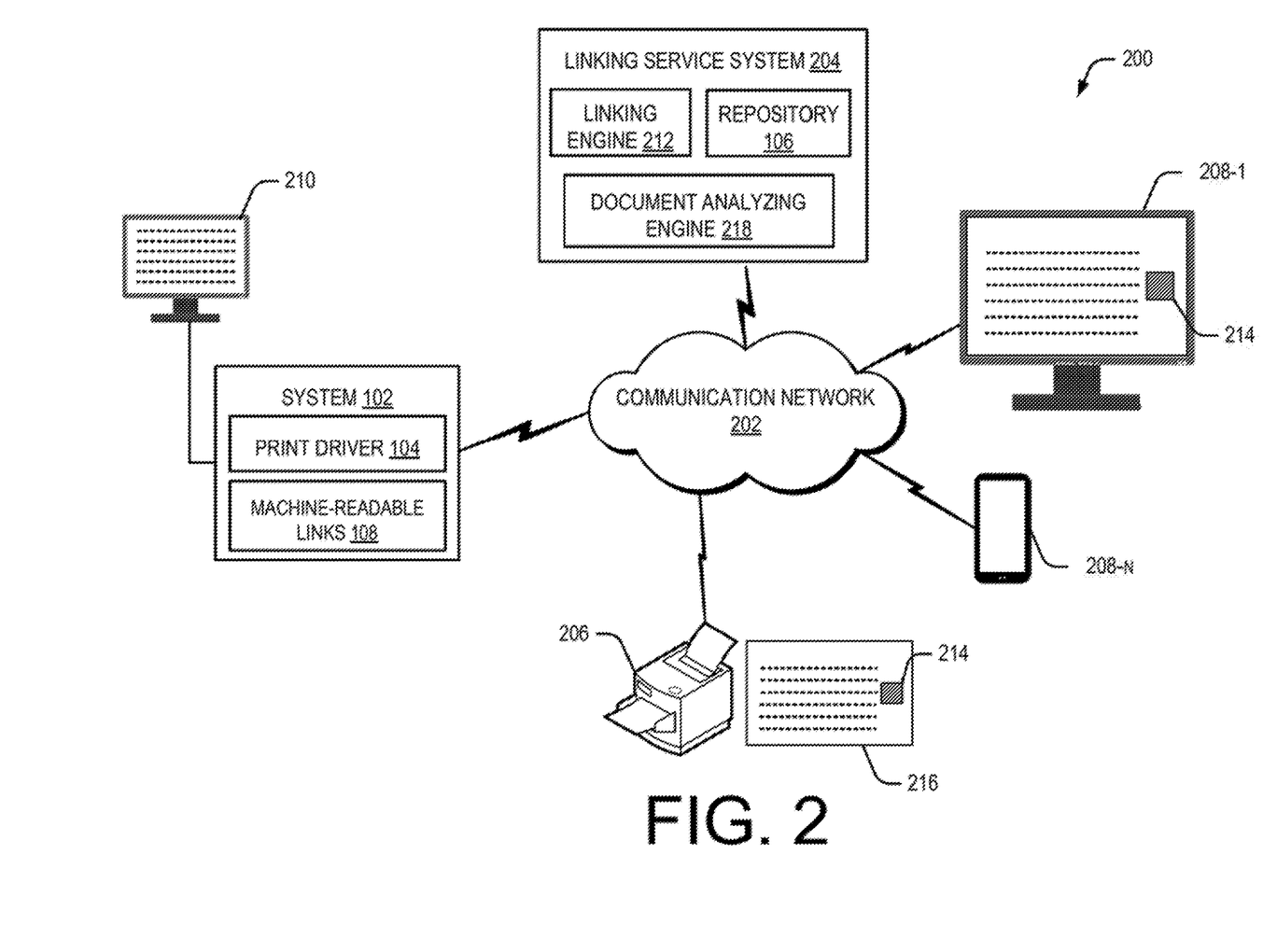
FIG. 2 is an example networked environment implementing a system to generate a print format version with an overlaid machine-readable link.

FIG. 2 schematically illustrates a network environment 200 implementing the example system 102 which provides access to digital content using a machine-readable link. The system 102 includes a print driver 104. The system 102 may be implemented as, but is not limited to, at least one server, workstation, computer, or the like. The system 102 may be in communication with one or more different computing entities or peripheral devices over a communication network 202. The users may use and interact with the system 102, or may do so by way of any other computing devices (not shown in FIG. 2) in communication with the system 102, and being operated and utilized by such users. During the course of using and operating such other computing devices, the users may provide their user credentials. Such user credentials may subsequently be communicated to the system 102, and eventually obtained by the print driver 104. The network 202 may include, for example, a local area network (LAN), a wireless local area network (WLAN), a virtual private network (VPN), the Internet, or the like, or a combination thereof. In some examples, a computer network may include a telephone network (for example, a cellular telephone network). In one example, the system 102 may be in communication with a linking service system 204. Besides the linking service system 204, the system 102 may be in communication with a print device 206, and one or more other remote computing devices 208-1, . . . , n (collectively referred to as remote computing devices 208).

Computing devices, such as system 102 may allow any user to access one or more digital documents. While accessing, the digital document, and contents thereof, may be viewable to the user on a display device associated with the respective computing devices. For example, for the system 102, the digital document may be viewable on its corresponding display device 210. Digital documents may be stored either locally, or may be accessible from external sources (not shown in FIG. 2). Besides viewing, users may also use the system 102 for printing the digital document onto a print medium, for example, by a print device 206.

In the present example, the repository 106 is associated with the linking service system 204. The repository 106, amongst other data, stores a plurality of machine-readable links. The linking service system 204 further includes a linking engine 212. The linking engine 212 assigns each of the machine-readable links to a user account. The user account in turn corresponds to different users, thereby resulting in different users being assigned a plurality of different machine-readable links. In one example, each of the machine-readable links within the repository 106 is identifiable by way of a link ID. For assigning the users with a plurality of machine-readable links, the linking engine 212 may map the link IDs with the respective user identifiers.

For interacting with and using the system 102, a user may provide their respective user credentials. As described previously, the system 102 may be further in communication with other computing devices being used by their respective users. The users may provide their user credentials through the computing devices, which may be subsequently communicated to the system 102. In one example, each of such computing devices may be preconfigured with predefined credentials. Such credentials may be such that they uniquely identify the respective system, and consequently the users. Accordingly, the credentials are obtained and communicated to the system 102. The system 102 on receiving the user credentials may subsequently request the linking service system 204 for machine-readable links based on the user credentials. Based on the request, the linking service system 204 may obtain a first set of machine-readable links 108 assigned to the user, and communicate it to the system 102.

In operation, in order to print the digital document, a user of the system 102 may give a print command, using an application installed on the system 102. For completion and printing the digital document, the print command may be processed in the system 102, and routed through the communication network 202 for being executed by the print device 206. In one example, prior to being processed and communicated to the print device 206, the print command issued at the system 102 is intercepted by the print driver 104. The interception of the print command may be carried out within the print path of the operating system. For intercepting the print command, the print driver 104 may continuously monitor various function calls and system calls for initiating and completing the print command. The print command may be initiated by applications installed within the system 102. The function and system calls may be directed to various Application Program Interfaces (APIs) of the applications issuing the print command. Examples of such applications capable of issuing print command include, but are not limited to, word-processing applications, web-browsers, and document viewers. In operation, the print driver 104 may receive one or more instructions for printing a digital document. The print commands may be generally processed and directed to a print spooler corresponding to a print device, such as the print device 206. At this instant, commands for the print spooler may be intercepted by the print driver 104. The print driver 104, in the present example, may monitor all print related function and system calls, and intercept the print command once they are generated.

On intercepting, the print driver 104 may further process the print command to obtain print data. Print data may include various settings or instructions which when processed result in the representation of the print document to be printed by, say the print device 206. The print data may also indicate one or more attributes of the digital document, which is to be printed. Continuing with the present example, the print driver 104 may process the print data and identify one or more portions of the digital document. It should be understood that the digital document may be composed of combination of document elements such as texts, images and illustrations. Each of such document elements may be considered as occupying a certain portion of the digital document. While processing the print command, the print driver 104 may identify which portion of the digital document corresponds to which document element. For example, while processing the digital document, the system 102 may determine which portions of the digital document correspond to images or texts, or any other document elements.

Once the portion of the digital document is identified, the print driver 104 obtains a machine-readable link from the first set of machine-readable links 108, and overlays the obtained machine-readable link onto the identified portion of the digital document. In one example, the machine-readable link may be overlaid such that it is applied as tint over the identified portion of the digital document. In another example, the machine-readable link may be applied such that it is positioned adjacent, or in close proximity, to the identified portion of the digital document.

Once the machine-readable link is applied onto the digital document, the print driver 104 may generate a print format version corresponding to the digital document. The print format version is such that it retains the original content of the digital document, and includes the applied machine-readable link. The print format version may be considered as any intermediate file format or digital data which may subsequently be used for printing the digital document along with the applied machine-readable link onto a print medium. In another example, the print format version may also be used for digitally rendering on a display device, a representation of the digital document along with the applied machine-readable link.

As an example in FIG. 2, the representation of the digital document along with the applied machine-readable link is illustrated. The display associated with the computing device 208-1 depicts the digital document along with the machine-readable link 214. In another example, the print command may be allowed to execute once the print format version is generated. On completion of the print command the digital document along with the machine-readable link is printed as print document 216, with the applied machine-readable link 214.

Continuing with the present subject matter, the print format version once generated may be communicated to the remotely accessible network location for storage. In one example, the print format version may be communicated to the linking service system 204 for storage. Furthermore, the linking service system 204 may process the print format version to determine content-specific information. It is to be noted that the remotely accessible network location may be implemented in any other computing device other than the linking service system 204, without deviating from the scope of the present subject matter. In the present example, the linking service system 204 includes linking engine 212 and a document analyzing engine 218.

The document analyzing engine 218 within the linking service system 204 (referred to as the analyzing engine 218) analyzes the content of document elements of the digital document. In case the document element pertains to textual content, the analyzing engine 218 may parse the document element to extract one or more key words as attributes. Similarly, if the document element is an image, the analyzing engine 218 may extract image related attributes, such as name of author and source, and topic as attributes.

Based on the obtained attributes, the analyzing engine 218 may determine content-specific information. For example, for textual content the analyzing engine 218 may execute queries to perform a text-based search. In another example, if the document element pertains to an image, a similar image based search may also be conducted to determine information to the image or to determine similar images. The search may be executed on either a private data repository or a public data repository. The results obtained by the analyzing engine 218 may be collated as content-specific information pertinent to the content of the document element.

Once determined, linking engine 212 links or associates the content-specific information with the machine-readable links 108 of the corresponding document element. In one example, example the association between machine-readable links 108 and the content-specific information may be affected by way of mapping. In one example, the linking engine 212 may map a link identifier of the machine-readable links 108 to the content-specific information, thereby linking the machine-readable links 108 to the determined content-specific information.

As explained, the content-specific information may supplement the information included within the digital document. The content-specific information may be determined by the linking service system 204 through various image or text recognition mechanisms. For example, if a document element appearing within the portion is an image, the linking engine 212 may perform an image analysis to determine one or more associated attributes of the image. Similarly, attributes of text-based portions may be identified to further determine the appropriate content-specific information.

For determining content-specific information, the linking engine 212 may analyze the attributes of the document elements to determine content-specific information. The linking engine 212 may then conduct a search based on the attributes to obtain content-specific information. The content-specific information may be determined based on a search conducted on an information repository or may be provided by way of user input. On determining the content-specific information, the linking engine 212 may further link the content-specific information corresponding to the portion of the digital document, with the applied machine-readable link 214.

The machine-readable link applied onto the digital document may subsequently be resolved. In order to access the digital content, a computing system with an image capture device may capture an image of the machine-readable link 214 provided either on the printed document 212 or as rendered on any one of the computing devices 208. Such an image capturing device may be either integrated with the computing system, such as hand-held communication devices, or may be peripheral devices such as scanners, communicatively coupled to a computing device.

Once the image of the machine-readable link, such as the machine-readable link 214, is captured, the information encoded within the machine-readable link 214 is obtained. The encoded information attributes pertaining to the captured machine-readable link 214 may be communicated to the linking service system 204. Based on the received information encoded within the machine-readable link 214, the linking service system 204 may determine the corresponding content-specific information linked with the machine-readable link 214. In an example, linking engine 212 may determine the content-specific information based on a mapping between the machine-readable link 214 and the content-specific information. The content-specific information may then be communicated to the device associated with the image capturing device.

Figure 3:
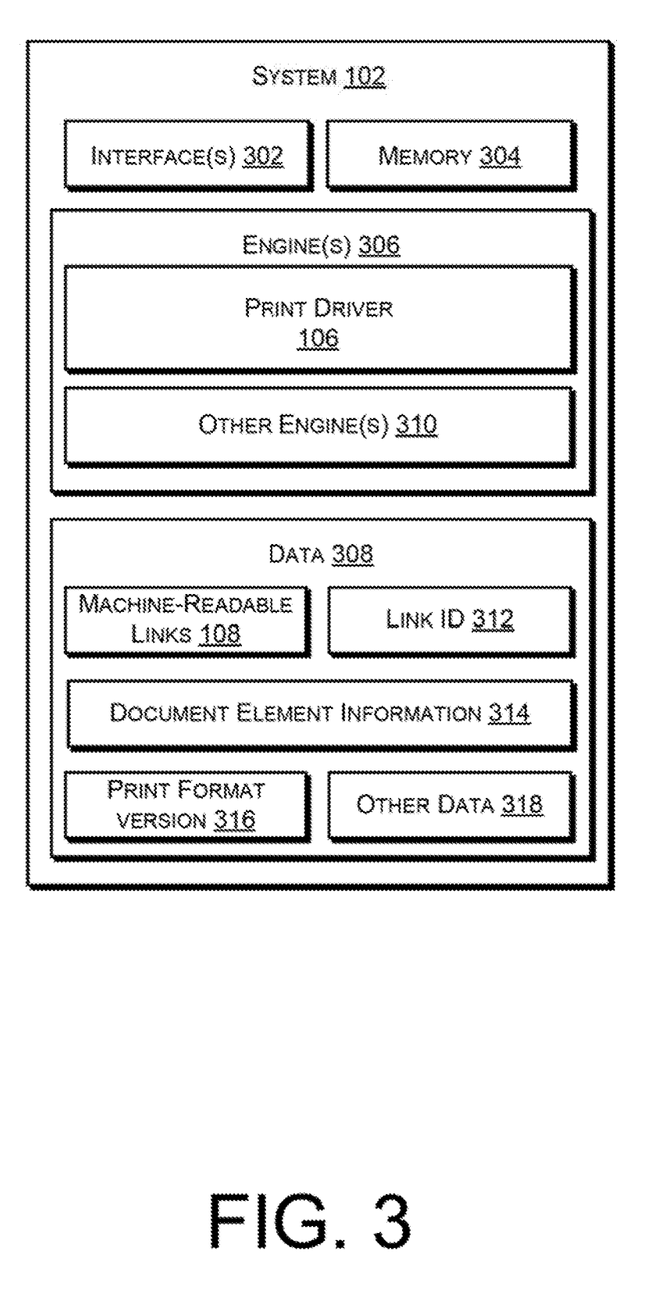
FIG. 3 is a block diagram of an example system to generate a print format version with an overlaid machine-readable link.

FIG. 3 illustrates an example system 102 to generate a print format version with overlaid machine-readable link. The system 102 may be implemented as a standalone computing system communicatively connected through a network (for example, network 202) to other devices, such as computing devices 208. In another example, the system 102 may also be implemented onto the computing devices 204, which in turn are used for viewing the digital document. The system 102 includes interface(s) 302 and memory 304. The interface(s) 302 may include a variety of interfaces, for example, interfaces for data input and output devices, referred to as I/O devices, storage devices, network devices, and the like. The interface(s) 302 facilitate communication between the system 102 and various computing devices connected in a networked environment, such as environment 300.

The memory 304 may store one or more computer-readable instructions, which may be fetched and executed so as to cause to provide access to digital content using a machine-readable link. The memory 304 may include any non-transitory computer-readable medium including, for example, volatile memory such as RAM, or non-volatile memory such as EPROM, flash memory, and the like.

The system 102 may further include engine(s) 306 and data 308. The engine(s) 306 may be implemented as a combination of hardware and programming (for example, programmable instructions) to implement one or more functionalities of the engine(s) 306. In examples described herein, such combinations of hardware and programming may be implemented in a number of different ways. For example, the programming for the engine(s) 306 may be processor executable instructions stored on a non-transitory machine-readable storage medium and the hardware for the engine(s) 306 may include a processing resource (for example, one or more processors), to execute such instructions. In the present examples, the machine-readable storage medium may store instructions that, when executed by the processing resource, implement engine(s) 306. In such examples, the system 102 may include the machine-readable storage medium storing the instructions and the processing resource to execute the instructions, or the machine-readable storage medium may be separate but accessible to system 102 and the processing resource. In other examples, engine(s) 306 may be implemented by electronic circuitry.

The data 308 includes data that is either predefined or generated as a result of the functionalities implemented by any of the engine(s) 306. In an example, the engine(s) 306 include the print driver 104, and other engine(s) 310. The other engine(s) 310 may implement functionalities that supplement applications or functions performed by the system 102. Further, the data 308 may include machine-readable links 108, link ID 312, document element information 314, print format version 316 and other data 318. The other data 318 may include data generated and saved by the engine(s) 306 for implementing various functionalities of the system 102.

In operation, the system 102 may obtain a first set of machine-readable links. In one example, the set of machine-readable links once obtained are stored as machine-readable links 108 within the system 102. The repository 106, from which the machine-readable links 108 were obtained, may be associated with a linking service (for example implemented through linking service system 204) linking each of the machine-readable links with a different user account. As a result, any user with the corresponding user account would be assigned or associated with a plurality of machine-readable links. The machine-readable links may correspond to the user either interacting with the system 102 or a user logged onto the system 102 using their respective user credentials.

During the course of using the system 102, the user may issue a print command. The print command is intercepted by the print driver 104. In one example, the print driver 104 further analyzes the intercepted print command to determine print data. Besides information pertaining to the print device for which the print command was issued, the print data may also include data corresponding to a digital document. For example, such print data may include information defining metadata corresponding to the digital document to be printed. Examples of such metadata include, but are not limited to, data related to the content of the digital document, the structure of the digital document, data pertaining to font, layout of images, etc.

The metadata once obtained is further analyzed by the print driver 104. Upon analyzing, the print driver 104 may identify one or more portions of the digital document. The digital document generally includes content organized into document elements, each of which may form a portion of the digital document. Generally, such portions are visually discernable from each other, as each of such portions may be confined within a certain displayable area on the digital document. Text portions, images, illustrations, etc., are few examples of such document elements. Each of such elements would therefore pertain to a portion of the digital document. In one example, information pertaining to such document elements is stored in the system 102 as document element information 314.

Based on the document element information 314, the print driver 104 identifies one or more portions of the digital document. Each of the portions may be associated with an identifier. Once the portions of the digital document are identified, the print driver 104 obtains a machine-readable link from the set of machine-readable links 108 and applies the same onto a portion of the digital document. In a similar manner, the print driver 104 may then obtain another machine-readable link from the set of machine-readable links 108, and apply the other machine-readable link onto another portion of the digital document. In this manner, the print driver 104 may continue to apply other machine-readable links obtained from the set of machine-readable links 108 till all the portions of the digital document have been accommodated or till the set of machine-readable links 108 has exhausted.

In case the first set of machine-readable links 108 is exhausted, the print driver 104 may further communicate with the repository 106 to request another set of machine-readable links. The repository 106 may provide the system 102 with a fresh set of machine-readable links in accordance with the request. In one example, the repository 106 may provide the other set of machine-readable links based on the user credentials. The other set of machine-readable links may subsequently be stored in machine-readable links 108. Once the machine-readable links 108 are relished, the print driver 104 may subsequently utilize the fresh machine-readable links 108 for applying onto other portions of some other digital document. In another example, the provisioning of the machine-readable links 108 may be based on a subscription model wherein a fixed set of machine-readable links may be allocated to a user during predefined time windows.

While applying the machine-readable link to the portion of the digital document, the print driver 104 may determine a unique identifier associated with each of the machine-readable links 108. In one example, the unique identifiers of the machine-readable links 108 are stored in the system 102 as link ID 312. Besides the unique identifier, the link ID 312 may also include other identifiers such as name variables, and tags. In one example, the link ID 312 may be encoded or embedded within the respective machine-readable links 108. While applying any of the machine-readable links 108 onto the portions of the digital document, the print driver 104 may map the document element information 314 to the link ID 312 capturing which portion of the digital document is associated with which one of the machine-readable links 108.

Machine-readable links 108 may include any printed indicators which are optically readable by an image capturing device in communication with a computing system. The image capturing device may either be a standalone apparatus coupled to the computing device or may be iterated within such a computing device. Examples of machine-readable links include, but are not limited to, one- or two-dimensional barcodes, digital watermarks, optically readable images, QUICK RESPONSE (QR) codes, and the like. The machine-readable link, such the machine-readable link 214 provided onto the printed document 216 may or may not be visible or discernible to a naked eye. In one example, a link may be a watermarked image which is overlaid onto the document element information 314 of the digital document. The watermarked image may be semi-transparent or tinted which allows the portion of the digital document onto which it is applied to be visible to the naked eye, but would also enable the image capturing device to detect and capture said machine-readable link 214.

The print driver 104 may further process the digital document with the overlaid machine-readable links, such as machine-readable link 214, to generate a print format version. The generated print format version may be stored within the system 102 as print format version 316. The print format version 316 may be considered as any intermediate file format or corresponding digital data which may be used for rendering the contents of the digital document along with the overlaid machine-readable links 108. The rendering may be affected on a print medium or on a display device associated with computing devices, such as computing devices 208. Examples of computing devices 208 include, but are not limited to, desktops, laptops, workstations, hand-held computing devices, such as palmtops, tablet PCs, and so on. Once rendered in conformance with the print format version 316, the digital document is viewable along with the overlaid machine-readable links 108. In one example, the print format version may include Portable Document Format (PDF) file format, an Open XML Paper Specification (XPS), and an Enhanced Metafile (EMF) file format, without limiting the scope of the present subject matter. In one example, the print format version 316 may be transmitted and communicated to a remote network location, such as the linking service system 204 (not depicted in FIG. 3). The linking service system 204 on receiving the print format version 316 may store the same for subsequent use. In another example, other information such as mapping information between the link ID 312 and the document element information 314 is also communicated to the linking service system 204.

The linking service system 204 may also further determine and link content-specific information with the different machine-readable links, such as the machine-readable link 214 applied onto the digital document. In one example, determining and linking of the content-specific information may be implemented using the linking engine 212. It should be noted that the present example is only one manner in which content-specific information is determined and linked with the machine-readable link, such as machine-readable link 214. Other examples, involving any other engines implemented on other computing systems for determining and linking content-specific information may be utilized without deviating from the scope of the present subject matter.

As explained in conjunction with FIG. 2, analyzing engine 218 analyzes the content of the document elements of the digital document to determine its attributes. Based on the obtained attributes, the analyzing engine 218 may determine content-specific information. For example, for textual content the analyzing engine 218 may execute queries to perform a text-based search. In another example, if the document element pertains to an image, a similar image based search may also be conducted to determine information to the image or to determine similar images. The results obtained by the analyzing engine 218 may be collated as content-specific information pertinent to the content of the document element. Once determined, linking engine 212 links or associates the content-specific information with the machine-readable links 108 of the corresponding document element. In one example, the association between machine-readable links 108 and the content-specific information may be affected by way of mapping. The linking engine 212 may map link ID 312 of the machine-readable links 108 to the content-specific information, thereby linking the machine-readable links 108 to the determined content-specific information.

For resolving the machine-readable link 214, the machine-readable link 214 may be captured using an image capturing device (e.g., device 208-N). Resolving any machine-readable link may be understood as returning or providing content-specific information linked with the machine-readable link to a user, when such link is interacted with or captured. The device 208-N on capturing the machine-readable links 108 may determine a link ID, such as link ID 312 associated with the machine-readable links 108. The link ID 312 may then be communicated to the linking service system 204 over a communication network, such as the communication network 202. Once the link ID 312 corresponding to the captured image is received, the linking engine 212 may query a mapping between the various link ID 312 and the content-specific information. Accordingly, the appropriate content-specific information may be determined. The content-specific information thus determined is communicated back to the device 208-N.

Figure 4:
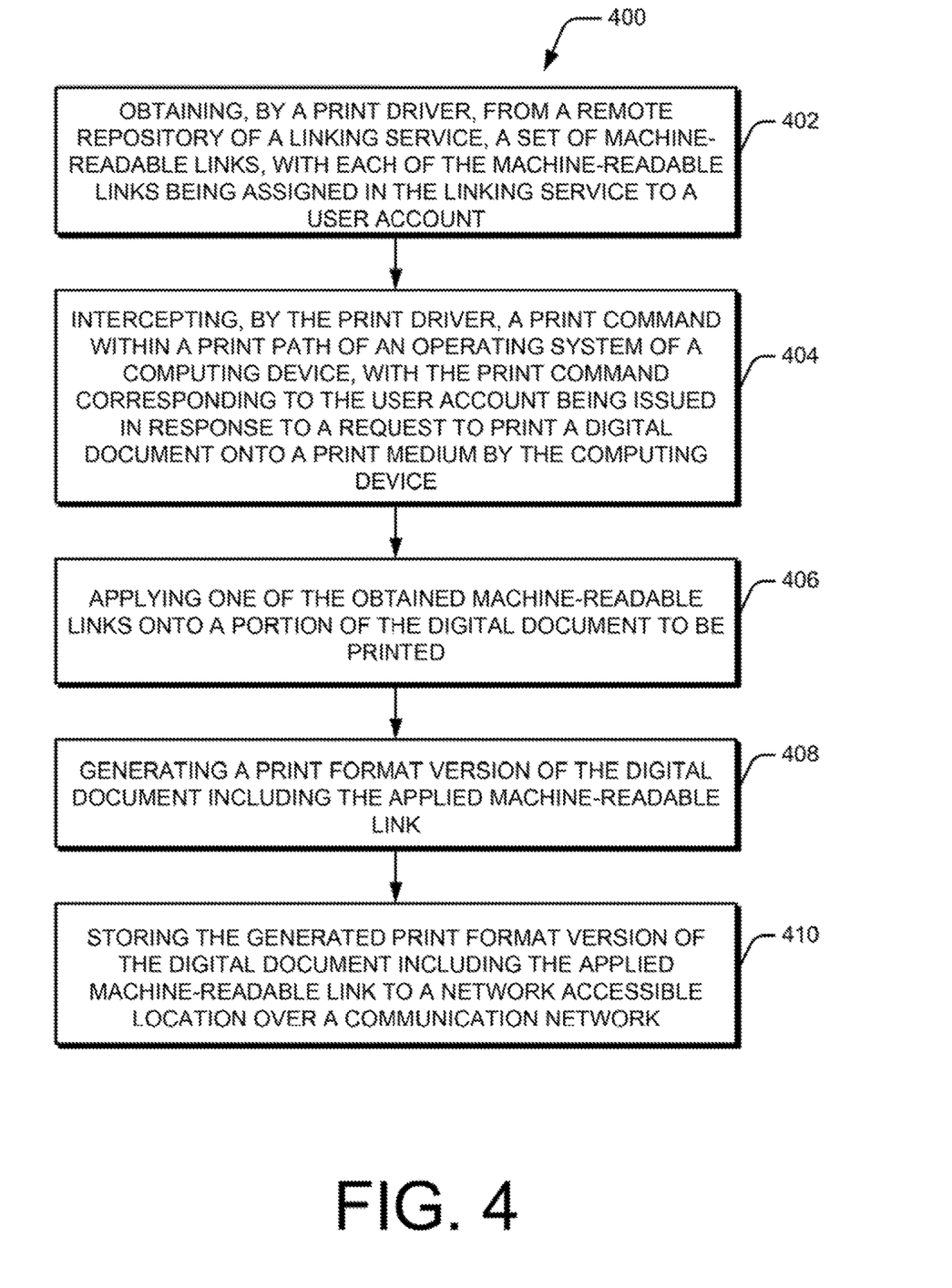
FIG. 4 is a flowchart of an example method for generating a print format version with an overlaid machine-readable link by a print driver.
Figure 5:
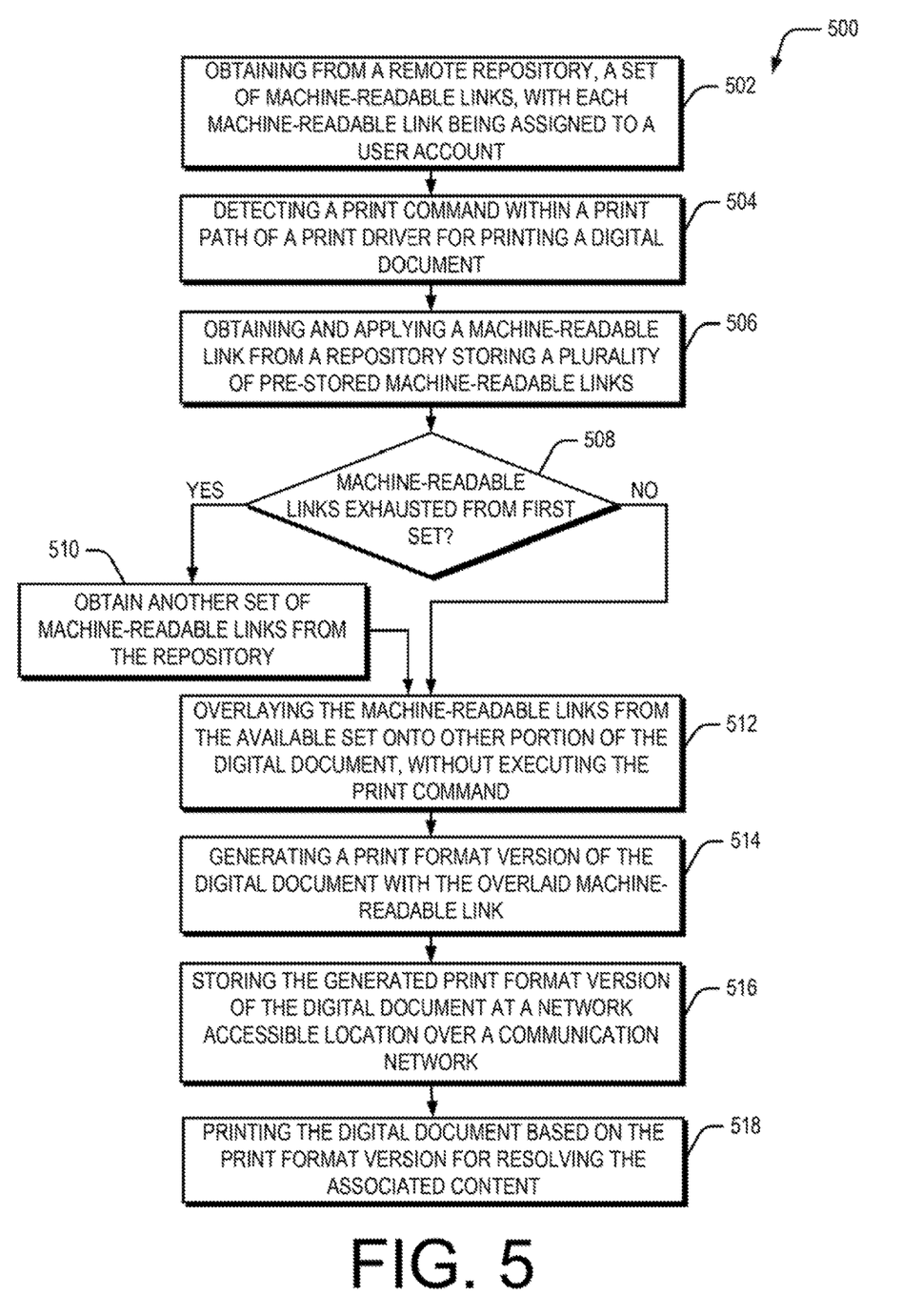
FIG. 5 is a flowchart of another example method for generating a print format version with an overlaid machine-readable link by a print driver.

FIGS. 4 and 5 illustrate example methods 400 and 500, respectively, to generate a print format version with an overlaid machine-readable link, according to an implementation of the present subject matter. The order in which the methods are described is not intended to be construed as a limitation, and any number of the described method blocks may be combined in any order to implement the aforementioned methods, or an alternative method. Furthermore, methods 400 and 500 may be implemented by processing resource or computing device(s) through any suitable hardware, non-transitory machine readable instructions, or combination thereof.

It may also be understood that methods 400 and 500 may be performed by programmed computing devices, such as system 102 as depicted in FIGS. 1-3. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 400 and 500 are described below with reference to system 102 as described above; other suitable systems for the execution of these methods may also be utilized. Additionally, implementation of these methods is not limited to such examples.

Referring to FIG. 4, at block 402, a set of machine-readable links is obtained from a remote repository. The remote repository is associated with a linking service, wherein such a linking service assigns a user account with one or more machine-readable links within the repository. In this manner, any specific user would have a number of machine-readable links assigned against their respective accounts. In one example, a user may be interacting with and using the system 102 after providing their user credentials. The system 102 on receiving the user credentials may subsequently request repository 106 associated with a linking service system 204 for machine-readable links. Based on the request, the linking service system 204 may obtain a first set of machine-readable links 108 assigned to the user from the repository 106, and communicate it to the system 102.

At block 404, a print command for printing a digital document is intercepted by a print driver of a computing system. For example, a user through the system 102 may issue a print command for printing a digital document In the present example, prior to being processed and communicated to the print device 206, the print command issued at the system 102 is intercepted by print driver 104 of the system 102. The print command may be intercepted while it is being processed within the print path of an operating system of the system 102. In another example, once intercepted the print driver 104 may further identify one or more portions of the digital document. Each of such portions may include document elements such as textual portions, images, illustrations, and so on.

At block 406, one machine-readable link from the set of machine-readable links is obtained and applied onto an identified portion of the digital document. For example, the print driver 104 may obtain a machine-readable link from a set of machine-readable links 108. The print driver 104 may subsequently apply the obtained machine-readable link onto a portion of the digital document. While applying, the print driver 104 may either overlay or may embed the machine-readable link into the identified portion of the digital document.

At block 408, a print format version of the digital document including the machine-readable link is generated. For example, once the machine-readable link has been applied onto the portion of the digital document, the print driver 104 generates a print format version 316 corresponding to the digital document. The print format version 316 in the present case includes the original content of the digital document along with the applied machine-readable link, such as machine-readable link 214. The print format version 316 may be considered as any digital format or file which may be used for rendering the digital document along with the machine-readable link 214. The rendering may be accomplished by way of printing the digital document through print device 206, or by displaying a representation of the digital document, but along with the machine-readable link 214.

At block 410, the generated print format version is transmitted to a network accessible location for storage. For example, the print format version may be communicated to the linking service system 204 for storage. Furthermore, the linking service system 204 may process the print format version, such as the print format version 316, to determine content-specific information. It is to be noted that the remotely accessible network location may be implemented in any other computing device other than the linking service system 204, without deviating from the scope of the present subject matter. In the present example, the linking service system 204 includes linking engine 212 and a document analyzing engine 218. The document analyzing engine 218 analyzes the print format version 316 and accordingly determines content-specific information. The content-specific information thus determined pertains to the portion onto which the machine-readable link is applied. Thereafter, the linking engine 212 links or associates the content-specific information to the machine-readable link, such as the machine-readable link 214.

FIG. 5 provides another example method 500 to generate a print format version with an overlaid machine-readable link. At block 502, a set of machine-readable links is obtained from a remote repository by a print driver, with each of the machine-readable inks being associated with a user account. In an example, based on user credentials provided by a user interacting with and using the system 102, the system 102 may obtain a set of machine-readable links. The machine-readable links are obtained and stored as machine-readable links 108. In the present example, each of the machine-readable links 108 are further associated with a unique identifier, such as link ID 312.

At block 504, a print command is detected by a print driver within a print path of an operating system of a computing device. For example, the print driver 104 of the system 102 may detect and intercept the print command for printing a digital document, provided by a user. The print driver 104 may monitor the print path of an operating system, for such print command. If a print command is detected, the print command is intercepted by the print driver 104. In one example, the print driver 104 may further process the intercepted print command to obtain the print data. Print data may correspond to various settings or instructions which when processed, result in the representation of the print document to be printed by, say the print device 206. Based on the print data, the print driver 104 identifies various portions of the digital document. In the present example, while processing the digital document, the system 102 may determine which portions of the digital document correspond to images or texts.

At block 506, a machine-readable link is obtained from the set of machine-readable links assigned to a user, and applied onto an identified portion of the digital document. For example, the print driver 104 obtains a machine-readable link from the set of machine-readable links 108, and applies the obtained machine-readable link onto the identified portion of the digital document. The machine-readable link may be applied as a tint over the identified portion of the digital document or may be positioned in proximity of the identified portion. Once applied, the digital document includes the machine-readable link 214.

At block 508 a determination is made to ascertain whether the set of machine-readable links has exhausted. For example, the print driver 104 may repeatedly apply one or more machine-readable links 108 onto portions of the digital document. On determining that the set of machine-readable links 108 has exhausted ('Yes' path from block 508), the print driver 104 may further request the repository 106 for additional machine-readable links. Depending on the allotment of the machine-readable links to the user, the repository 106 may provide another set of machine-readable links to the system 102 (block 510). The method thereafter proceeds to block 512.

If however, the set of machine-readable links 108 is not yet exhausted ('No' path from block 508), the print driver 104 may further obtain additional machine-readable links 108 and overlay the additional machine-readable links 108 onto other identified portions of the digital document. In one example, the application of the machine-readable links 108 (obtained from either the first set or the other set) onto the various portions of the digital document is implemented without executing the print command (block 512).

At block 514, a print format version of the digital document including the one or more machine-readable links, is generated. For example, once the machine-readable link, such as machine-readable link 214, has been applied onto the portion of the digital document, the print driver 104 generates a print format version 316 corresponding to the digital document with the machine-readable link 214. The print format version 316 may be used for rendering the digital document along with the machine-readable link 214. For rendering, the digital document may be printed using print device 206, or by displaying a representation of the digital document, included with the machine-readable link 214. Such rendering is based on the print format version 316.

At block 516, the generated print format version is transmitted to a network accessible location for storage. In one example, the network accessible location is implemented as linking service system 204. Continuing with the present example, the linking service system 204 may process the print format version, such as the print format version 316, to determine content-specific information using linking engine 212 and document analyzing engine 218. The document analyzing engine 218 analyzes the print format version 316 and accordingly determines content-specific information. The content-specific information thus determined pertains to the portion onto which the machine-readable link is applied. In one example, the along with the print format version 316, information pertaining to the link ID 312, various mappings between the link ID 312 and the machine-readable links 108, and other information may also be transmitted and stored at the linking service system 204.

At block 518, the digital document may be printed and the included machine-readable link may be resolved. In one example, resolving the machine-readable link 214, may involve capturing an image of an applied machine-readable link 214 using an image capturing device (e.g., device 208-N). Resolving any machine-readable link may be understood as retrieving or providing content-specific information linked with the machine-readable link to a user, when such link is interacted with, or captured. The resolving of the machine-readable link 214 may be based on link ID 312. Once the link ID 312 is determined, the corresponding content-specific information may be retrieved and provided to a computing system coupled with the device 208-N.

Figure 6:
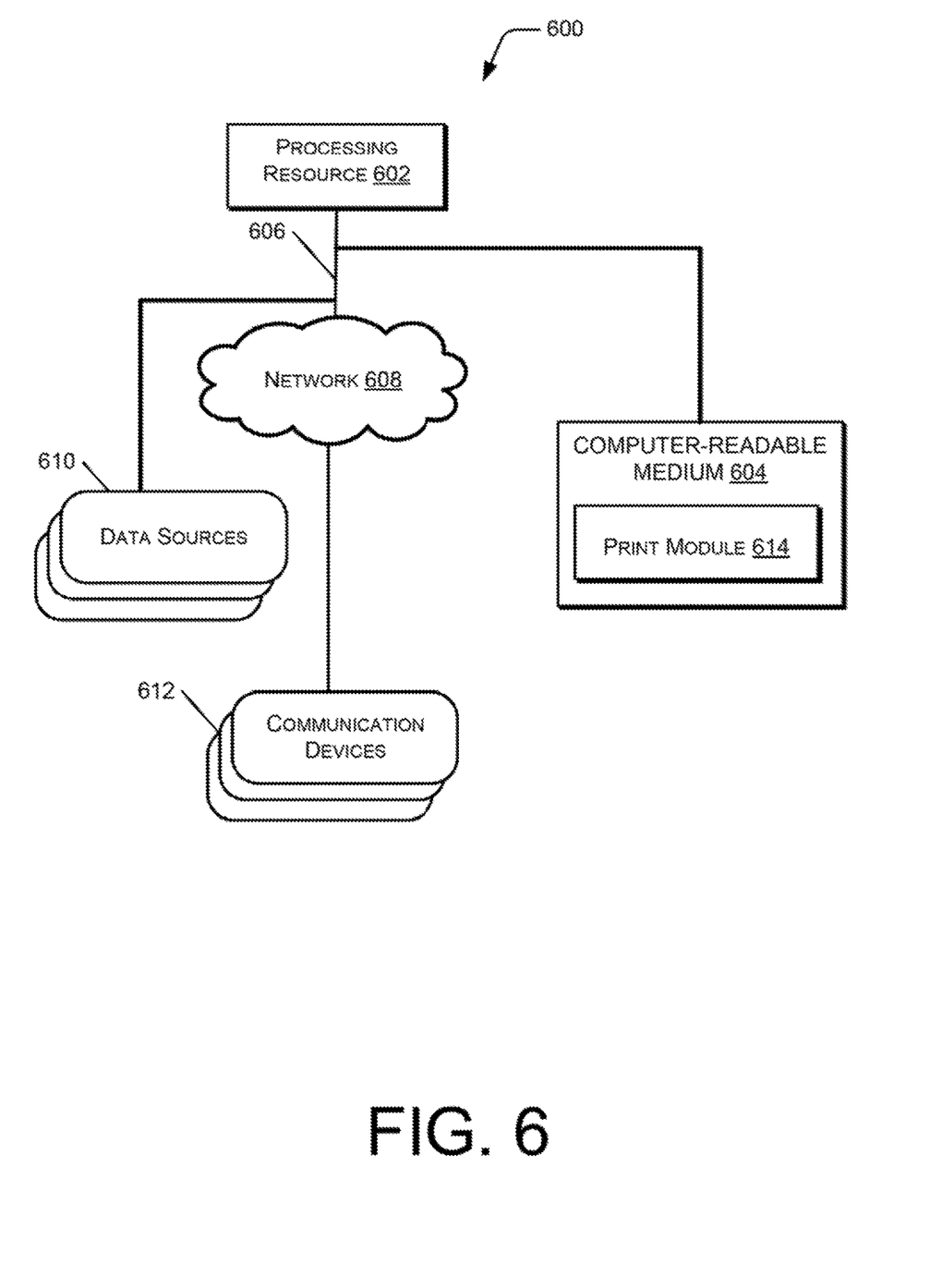
FIG. 6 is a block diagram of an example system implementing a non-transitory computer-readable medium, to generate a print format version with an overlaid machine-readable link by a print driver.

FIG. 6 illustrates a system environment 600 to generate a print format version with an overlaid machine-readable link, according to an example of the present disclosure. The system environment 600 may comprise at least a portion of a public networking environment or a private networking environment, or a combination thereof. In one implementation, the system environment 600 includes a processing resource 602 communicatively coupled to a computer readable medium 604 through a communication link 606.

For example, the processing resource 602 can include one or more processors of a computing device to generate a print format version with an overlaid machine-readable link. The computer readable medium 604 can be, for example, an internal memory device of the computing device or an external memory device. In one implementation, the communication link 606 may be a direct communication link, such as any memory read/write interface. In another implementation, the communication link 606 may be an indirect communication link, such as a network interface. In such a case, the processing resource 602 can access the computer readable medium 604 through a network 608. The network 608 may be a single network or a combination of multiple networks and may use a variety of different communication protocols.

The processing resource 602 and the computer readable medium 604 may also be coupled to data sources 610 through the communication link 606, and/or to communication devices 612 over the network 608. The coupling with the data sources 610 enables in receiving the data in an offline environment, and the coupling with the communication devices 612 enables in receiving the data in an online environment.

In one implementation, the computer readable medium 604 includes a set of computer readable instructions, implementing a print module 614. The print module 614 may, in one example, be a print driver in a computing system with the computer readable medium 604. The print driver when executed by the processing resource 602, implements the functionalities as described in conjunction with FIGS. 1-3, through the print module 614. The set of computer readable instructions within medium 604 can be accessed by the processing resource 602 through the communication link 606 and subsequently executed to process data communicated with the data sources 610 in order to generate a print format version with an overlaid machine-readable link.

In the present example, a system within the system environment 600 is in communication with a repository, such as repository 106. The repository 106 may in turn be associated with a central print-related service being implemented in a computing device (not shown in FIG. 6). The repository 106 amongst other data, stores a plurality of machine-readable links. The print-related service, such as that implemented using linking service system 204 may include a linking engine. The linking engine, such as a linking engine 212 assigns each of the machine-readable links within the repository 106 to a user account. The user account in turn corresponds to a user. In a similar manner, within the repository 106, a plurality of user accounts may be associated with unique machine-readable links. In one example, each of the machine-readable links within the repository 106 is identifiable by way of a link ID. For assigning the users with a plurality of machine-readable links, the linking engine 212 may map the link IDs with the respective user identifiers.

The print module 614 may receive user credentials from a user, for example during the course of interaction with system 102. The print module 614 on receiving the user credentials may subsequently request the repository 106 for machine-readable links based on the user credentials. Based on the request, the repository 106 may obtain a first set of machine-readable links 108 assigned to the user, and communicate it to the print module 614.

In operation, a user of the system 102 may initiate a print command. For completion and printing the digital document, the print command may be processed and routed through the communication link 606 for being executed by the processing resource 602. In one example, prior to being processed by the processing resource 602, the issued print command is intercepted by the print module 614. Once intercepted, the print module 614 may further process the print command to obtain print data. The print module 614 depending on the print data obtained from the intercepted command, may identify one or more portions of the digital document. It should be understood that the digital document may be composed of combination of document elements such as texts, images and illustrations. Each of such document elements may be considered as portions of the digital document. While processing the print command, the print module 614 may identify which portion of the digital document corresponds to which document element.

Once the portion of the digital document is identified, the print module 614 obtains one machine-readable link from the first set of machine-readable links 108, and overlays the obtained machine-readable link onto the identified portion of the digital document. With the applied machine-readable link, such as the machine-readable link 214, the print module 614 generates a print format version corresponding to the digital document. The print format version is such that it retains the original content of the digital document, and includes the applied machine-readable link, such as the machine-readable link 214.

The print format version may be considered as any file format or digital data which may subsequently be used for printing the digital document along with the applied machine-readable link 214, onto a print medium. In another example, the print format version may also be used for digitally rendering on a display device, a representation of the digital document along with the applied machine-readable link 214. On completion of the print command the digital document along with the machine-readable link is printed, for example as print document 216, with the applied machine-readable link 214.

The print format version, such as the print format version 316, once generated may be communicated to a remotely accessible network location for storage. In one example, the print format version may be communicated by the print module 614 to the linking service system 204 for storage. Furthermore, the linking service system 204 may process the print format version to determine content-specific information, using a document analyzing engine, such as the analyzing engine 218. The analyzing engine 218 analyzes the content of document elements of the digital document. In case the document element pertains to textual content, the analyzing engine 218 may parse the document element to extract one or more key words as attributes. Similarly, if the document element is an image, the analyzing engine 218 may extract image related attributes, such as name of author and source, and topic as attributes.

Based on the obtained attributes, the analyzing engine 218 may determine content-specific information. Once determined the linking engine 212 links or associates the content-specific information with the machine-readable links 108 of the corresponding document element. In one example, example the association between machine-readable links 108 and the content-specific information may be affected by way of mapping. In one example, the linking engine 212 may map a link identifier of the machine-readable links 108 to the content-specific information, thereby linking the machine-readable links 108 to the determined content-specific information. Subsequently, the machine-readable link may be resolved using additional device, such as an image capturing device.

Although examples for the present disclosure have been described in language specific to structural features and/or methods, it should stood that the appended claims are not necessarily limited to the specific features or methods described. Rather, the specific features and methods are disclosed and explained as examples of the present disclosure.

We claim:

1. A method comprising:
   by a print driver, obtaining from a remote repository of a linking service, a set of machine-readable links, with each of the machine-readable links being assigned in the linking service to a user account;
   intercepting, by the print driver, a print command within a print path of an operating system of a computing device, with the print command corresponding to the user account being issued in response to a request to print a digital document onto a print medium by the computing device;
   applying one of the obtained machine-readable links onto a portion of the digital document to be printed;
   generating a print format version of the digital document including the applied machine-readable link; and
   storing the generated print format version of the digital document including the applied machine-readable link to a network accessible location over a communication network.

2. The method as claimed in claim 1, further comprising:
by a document analyzing engine executing at the network accessible location, detecting content present in the portion of the digital document;
analyzing the content present in the portion of the digital document;
obtaining content-specific information based on the analyzing; and
linking the content-specific information with the applied machine-readable link, wherein upon linking, the machine-readable link is readable to provide access to the content-specific information using the communication network.

3. The method as claimed in claim 1, wherein the method further comprises:
determining identification attributes associated with the machine-readable link within the print format version; and
transmitting and storing the identification attributes of the machine-readable link to the network accessible location.

4. The method as claimed in claim 2, wherein the obtaining the content-specific comprises:
parsing and extracting the content from the portion of the digital document;
performing text-based analysis of the extracted content to obtain content attributes; and
further obtaining content-specific information based on the content attributes.

5. The method as claimed in claim 4, wherein the content-specific information is obtained from one of a private data repository and a public data repository.

6. The method as claimed in claim 2, wherein the linking comprises:
determining a unique identifier of the machine-readable link applied onto the portion of the digital document; and
mapping the unique identifier of the machine-readable link with the content-specific information corresponding to the portion of the digital document.

7. The method as claimed in claim 1, wherein the print format version is one of a Portable Document Format (PDF) file format, an Open XML Paper Specification (XPS), and an Enhanced Metafile (EMF) file format.

8. A system comprising:
a print driver, wherein the print driver is to,
obtain a set of machine-readable links assigned to a user account from a remote repository;
in response to detecting a print command for printing a digital document with the print command being associated with a user associated with the user account, select one machine-readable link from amongst the set of the machine-readable links;
prior to executing the print command, overlay the selected machine-readable link onto a portion of the digital document to be printed;
generate a print format version of the digital document including the overlaid machine-readable link; and
store the generated print format version at a network accessible location over a communication network.

9. The system as claimed in claim 8, wherein the print driver, to identify a portion of the digital document for overlaying the machine-readable link, is to:
determine document elements within the content of the digital document by processing the print command; and
based on information corresponding to the document elements, identify a portion of the digital document for overlaying by the machine-readable link.

10. The system as claimed in claim 9, wherein the print driver to identify portion of the digital document is further to:
intercept the print command within a print path of an operating system of a computing device; and
process the intercepted print command to determine the document elements within the digital document.

11. The system as claimed in claim 8, wherein the machine-readable link is associated with a default Uniform Resource Locator (URL).

12. The system as claimed in claim 8, further comprising a display device to display the digital document comprising the machine-readable link, in conformance with the print format version.

13. The system as claimed in claim 8, wherein the print driver is to further:
determine whether the set of machine-readable links assigned to the user account have exhausted;
request a second set of machine-readable links from the remote repository based on the user account;
select one other machine-readable link from the second set of machine-readable links; and
overlay the other selected machine-readable link onto another portion of the digital document.

14. A non-transitory computer-readable medium comprising instructions executable by a processing resource to:
obtain, by a print driver and from a remote repository of a linking service, a set of machine-readable links, with each of the machine-readable links being associated with a user account;
monitor, by the print driver, a print path of an operating system for print commands from the user account;
on detecting a print command for printing a digital document, embed a machine-readable link, from the set of machine-readable links obtained from the remote repository of the linking service, onto a portion of the digital document to be printed; and
generate a print format version of the digital document with the embedded machine-readable link.

15. The computer-readable medium of claim 14, wherein the instructions, executable by a processing resource, are to further:
obtain a second set of machine-readable links from the remote repository on determining that the machine-readable links assigned to the user account have exhausted based on credentials of the user; and
overlay another machine-readable link from amongst the second set of machine-readable links onto another portion of the digital document to be printed.

* * * * *